United States Patent [19]

Joshi

[11] 4,156,260
[45] May 22, 1979

[54] CARTRIDGE-LOADING TAPE RECORDER

[75] Inventor: Uday W. Joshi, Ann Arbor, Mich.

[73] Assignee: Sycor, Inc., Ann Arbor, Mich.

[21] Appl. No.: 861,942

[22] Filed: Dec. 19, 1977

[51] Int. Cl.² .................. G11B 15/32; G11B 23/04
[52] U.S. Cl. .................. 360/96.1; 242/199; 360/94
[58] Field of Search .............. 360/96, 94, 92, 95, 360/132, 134; 242/198–200

[56] References Cited

U.S. PATENT DOCUMENTS

| | | | |
|---|---|---|---|
| 3,488,058 | 1/1970 | Staar | 360/96 |
| 3,578,261 | 5/1971 | Yamamoto et al. | 242/199 |
| 3,902,681 | 9/1975 | Boehme | 242/198 |
| 3,976,262 | 8/1976 | Kennedy | 360/96 |
| 3,988,779 | 10/1976 | Leis et al. | 360/96 |
| 4,008,490 | 2/1977 | Lemelson | 360/94 |

OTHER PUBLICATIONS

IBM Tech. Disc. Bull., Stock, Magnetic Tape Cartridge Holder, vol. 18, No. 3, Aug. 1975, pp. 781–782.

*Primary Examiner*—Alfred H. Eddleman
*Attorney, Agent, or Firm*—Price, Henveld, Huizenga & Cooper

[57] ABSTRACT

The specification discloses a cartridge-loading tape recorder in which a fixed reference plane is provided for the tape relative to the head by means of cooperating locating means and arms which rise and engage the cartridge when the recorder door is closed behind it. The motor and drive are mounted in a heat isolating motor mount in a track and are biased into engagement with the tape to accomodate variations in the tape cartridge. The recorder is sturdily constructed, being based on a generally H-shaped extruded chasis which defines a platform, side walls and guide rails for the tape cartridge.

40 Claims, 16 Drawing Figures

CARTRIDGE-LOADING TAPE RECORDER

BACKGROUND OF THE INVENTION

The present invention relates to a tape recorder for recording or playing tape on a ¼" ANSI (cassette) type cartridge. It is particularly designed for use in computer systems for recording and playing taped information.

Minnesota Mining and Manufacturing Company has developed a large capacity tape cartridge for archive storage. The cartridge is designed to provide very accurate feed and control for the tape. However, existing tape recorders do not satisfactorily match the quality of the tape cartridge.

In existing recorders, there tends to be too much play in the cartridge relative to the recording pickup head. Existing recorders lack means to compensate for irregularities in the cartridge drive system. The heat of the motor can distort the tape; and noise from the motor can distort recording or playing.

SUMMARY OF THE INVENTION

In the present invention, three spaced point locating bearing members are mounted on a tape recorder and define a reference plane relative to the recording head. Once the tape cartridge is generally in position adjacent to the tape recording head, means are activated for pushing the cartridge forward slightly and up slightly by means of arms to thereby tighten the cartridge against the bearing members to hold the cartridge in a fixed plane relative to the recorder head. In this way, variations in relationship between the cartridge and the recording head are eliminated.

Preferably, the motor and drive of the unit are mounted on a track and are biased into engagement with the tape. This accommodates variations in the cartridge itself. it is also preferable that the motor be mounted in a heat resistant mount which isolates the motor heat and motor vibration from the rest of the recorder.

In another aspect of the invention, the recorder construction is based on a generally H-shaped plastic or metal extrusion which provides side walls and a platform for mounting various components as well as inwardly projecting rails which serve generally as a guide to slide the cartridge forward into position.

These and other features, objects and advantages of the invention will be more fully understood and appreciated by reference to the written specification and appended drawings.

DESCRIPTION OF THE PREFERRED EMBODIMENT

Figure 1:
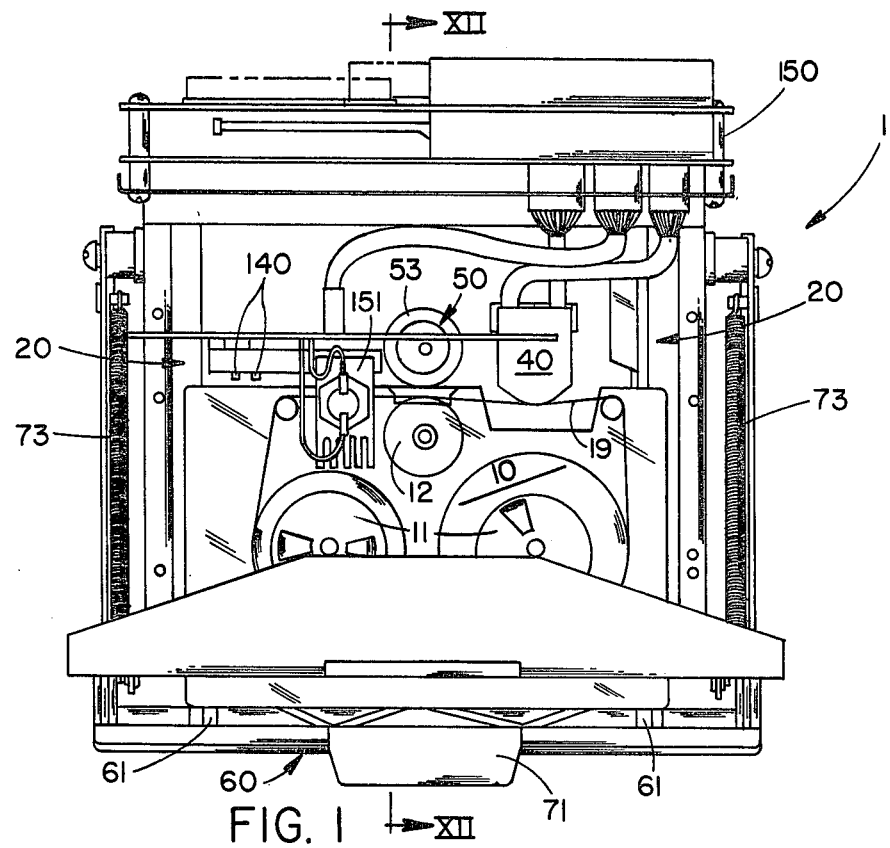
FIG. 1 discloses a plan view of the recorder with a cartridge loaded thereon but with the recorder door open.

In the preferred embodiment, the cartridge 10 is slid through the open front of recorder 1 and on to locating rails 20 which are integrally formed as part of the chasis 30 (see FIGS. 1, 2, 3, 7 and 8). Cartridge 10 is slid forwardly along rails 20 until its tape 19 engages recorder head 40 and its drive idler 12 engages main drive wheel 50 of recorder 1 (FIG. 1). Recorder door 60 is then closed and abutment shoulders 61 on door 60 come up and engage the rear of cartridge 10 and drive it forwardly into operable range of locating arms 80 (see FIGS. 2, 3, 4, 12 and 14).

Figure 12:
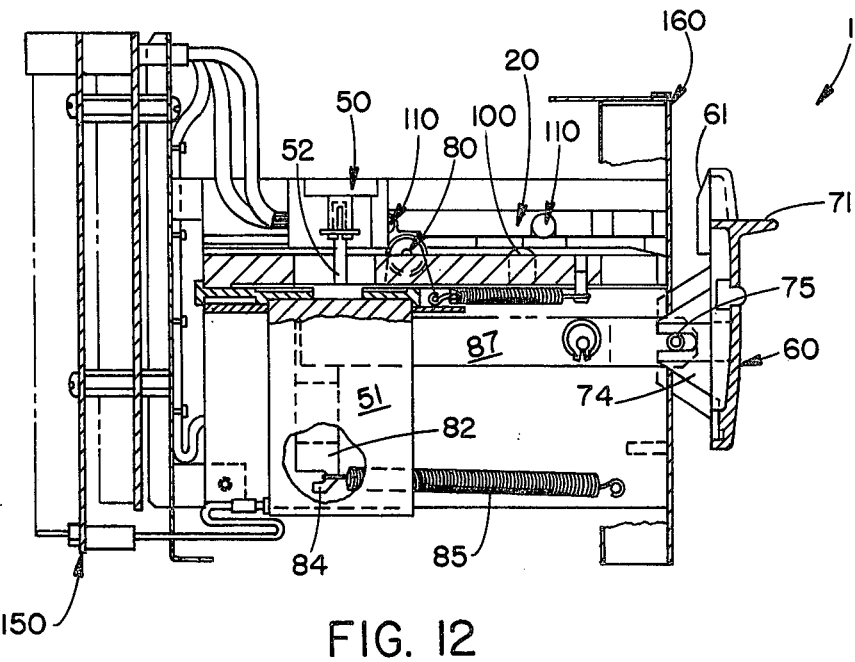
FIG. 12 is a generally cross-sectional view taken along plane XII—XII of FIG. 1, but with the tape cartridge removed.

Simultaneously, through a linkage system described below, forward locating arms 80 rise and push cartridge 10 tightly up against three locater bearings 110, one located on one rail 20 and two located on the opposite rail 20, and drive it forwardly into operating engagement with drive wheel 50 and recorder head 40 (see FIGS. 2, 3, 4, 12 and 14). A rear locater arm 100 on one side of chasis 30 also comes up beneath cartridge end to provide three point support from below which is comparable to the three point support from the locater bearings 110 above (see FIG. 12). To ensure snug contact between drive wheel 50 and drive idler 12 within cartridge 10, drive motor 51 is movable and is spring loaded forwardly as shown in FIG. 12 so that as cartridge 10 is pushed forwardly by forward locating arms 80, drive wheel 50 is pushed just slightly rearwardly (FIG. 12). This further activates one or both of a pair of microswitches 140, one of which enables one to activate the drive motor 51. The other acts in conjunction with a safety device on the cartridge to tell the electronic circuitry whether it is safe to record or erase.

Figure 11:
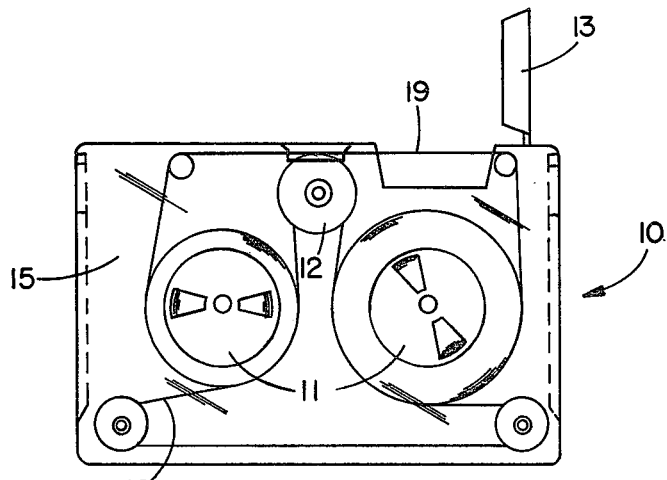
FIG. 11 is a top plan view of the cartridge with the tape access door open.

Cartridge 10 is a conventional product available from Minnesota Mining and Manufacturing Company. It includes reels 11, carrying tape 19, the reels being driven by a drive idler 12 through a drive belt 12a (FIG. 11). There is a small door 13 which opens to expose tape 19 to the recording head.

Figure 9:
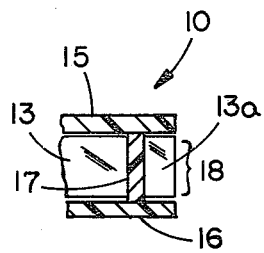
FIG. 9 is a fragmentary cross-sectional view of one side edge of the tape cartridge showing the track formed in each side of the cartridge.
Figure 10:
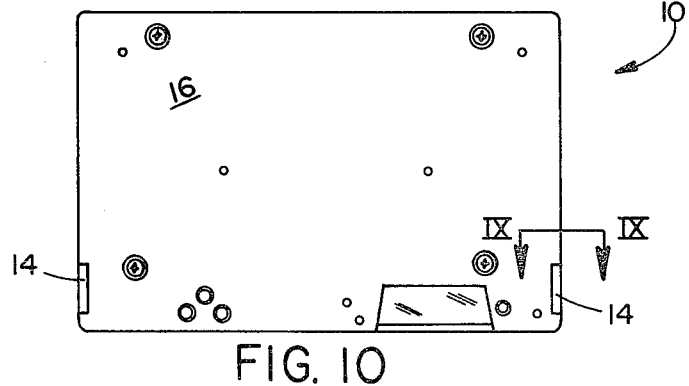
FIG. 10 is a bottom plan view of the cartridge.

The cartridge reels and tape are enclosed by a top plastic plate 15, a bottom metal plate 16 and peripheral plastic side walls 17 (FIGS. 9, 10 and 11). Bottom plate 16 includes locater notches 14 on either side which cooperate with arms 80 to help locate cartridge 10 within recorder 1. It will be noted that on the side edges, top plate 15 and bottom plate 16 overhang side wall 17 to define a track 18 therebetween. Track 18 rides on locater rails 20 of chasis 30. Door 13 includes an extending portion 13a which extends into track 18 at the front of the cartridge so that as one inserts cartridge 10 into the recorder, one of the rails 20 engages the flap portion 13a and flips door 13 open thereby exposing tape to recording head 40.

Figure 8:
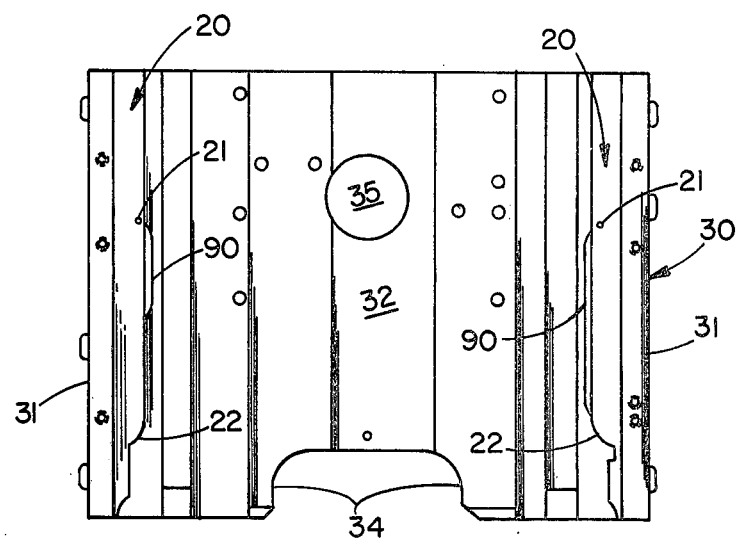
FIG. 8 is a top plan view of the chasis.
Figure 7:
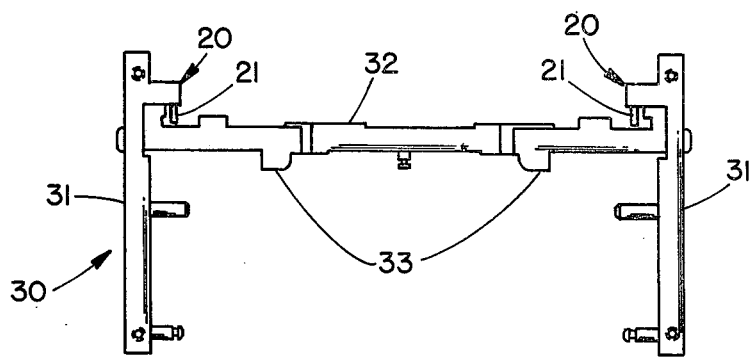
FIG. 7 is a front elevational view of the generally H-shaped chasis after various mounting and positioning posts have been added.

Locater rails 20 are integrally formed with chasis 30. Chasis 30 is an extruded, generally H-shaped piece of plastic (FIG. 7) or metal. After extrusion, additional machining operations may be performed on the chasis, as for example forming tapered leading edges 22 on rails 20. A small hole is also drilled through each rail 22 toward the rear thereof to accommodate a stop pin 21 (FIGS. 7 and 8). Stop pins 21 serve to limit the extent to which cartridge 10 can be pushed forward under the urging of door 60 when it is closed.

Chasis 30 is extruded out of aluminum. A structural plastic material might also be used.

As extruded, chasis 30 includes space side walls 31, the main platform 32, the guide rails 20 located above platform 32 and projecting inwardly from space side walls 31, and a pair of motor mount rails 33 located on the underside of platform 32 (FIG. 7). Various mounting holes for fasteners and the like are then drilled in the extruded chasis 30. A large hole 35 is cut through platform 32 to allow drive wheel 50 to be passed through platform 32. Similarly, a recess 34 is cut out at the front of chasis 30 to create a hand recess which allows one to reach in and grasp the cartridge and to reach behind the handle of door 60 to perform the manipulative operations necessary to insert and remove cartridge 10.

Figure 2:
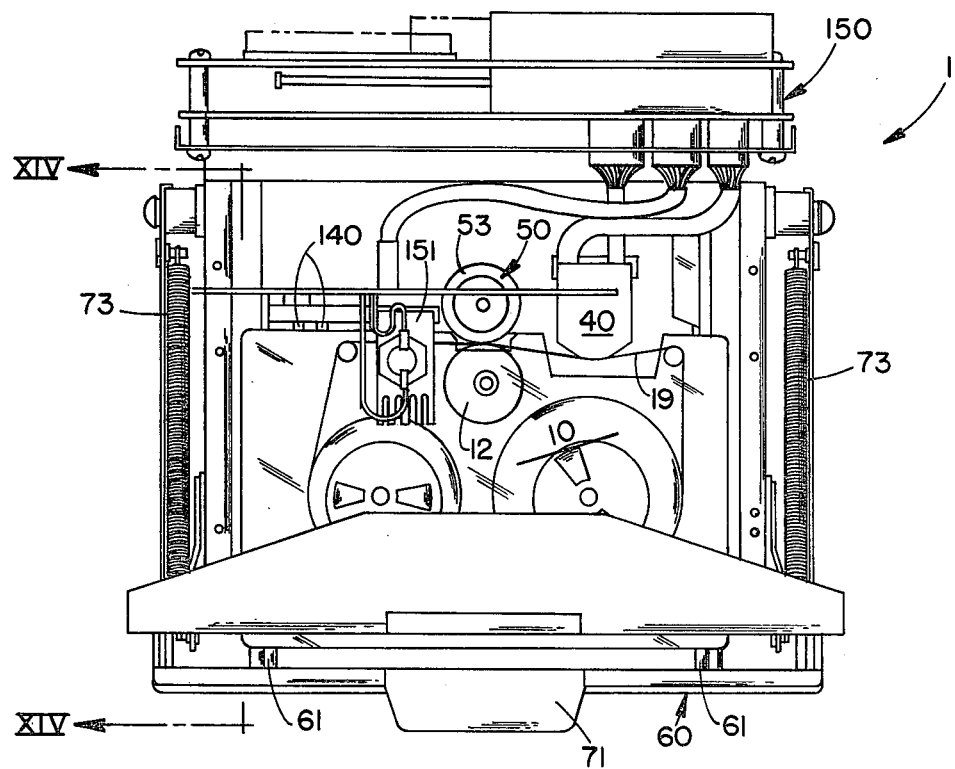
FIG. 2 discloses a plan view like FIG. 1 but with the cartridge door closed.

Recording head 40 is conventional and is secured by screws or like fasteners atop platform 32 in the location shown in FIGS. 1 and 2.

Drive wheel 50 which is located above platform 32 adjacent head 40 is joined to a drive motor 51 located below platform 32 by means of a drive axle 52 (FIG. 12). Wheel 50 includes a rubber rim 53 (FIG. 1) which contacts drive idler 12 of cartridge 10.

Figure 16:
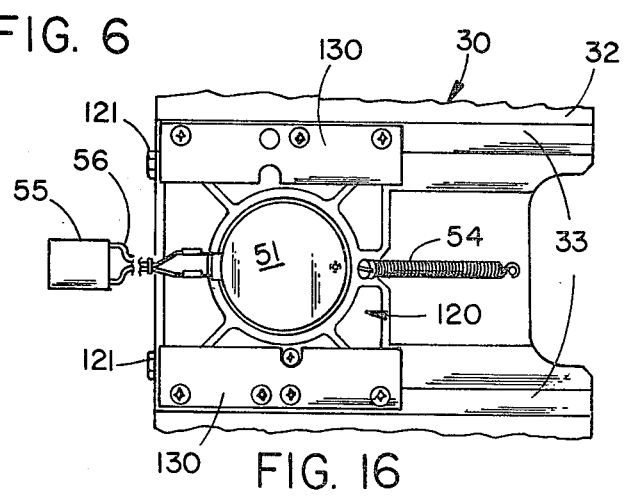
FIG. 16 is a fragmentary bottom plan view of the motor mount area of the chasis.

Motor 50 is mounted on a motor mount 120 which comprises a glass reinforced plastic plate with high temperature characteristics (FIG. 16). Glass reinforced polycarbonates are useful for this purpose. Plastic plate 120 itself rests between motor mount rails 33 of chasis 30 and a lip plate 130 is bolted to the bottom of each motor mount rail 33 and extends inwardly beyond rails 33 to trap motor mount 120 in place. Motor mount 120 can then slide along motor mount rails 33. A spring 54 is joined at one end to the front of motor mount 120 and at the other end to a pin secured in platform 32 of chasis 30. This urges motor mount 120, motor 51 and drive wheel 50 forwardly to the limits provided by the upwardly projecting stops 121 integrally molded into the rear of motor mount 120. Stops 121 project upwardly from motor mount 120 and catch the rear edge of platform 32 of chasis 30 to limit forward movement of motor mount 120. Extending from motor 51 are the usual electrical wiring 56 and a plug 55 whereby it can be plugged into the electronic circuits of the system to provide control and power for motor 51.

Figure 3:
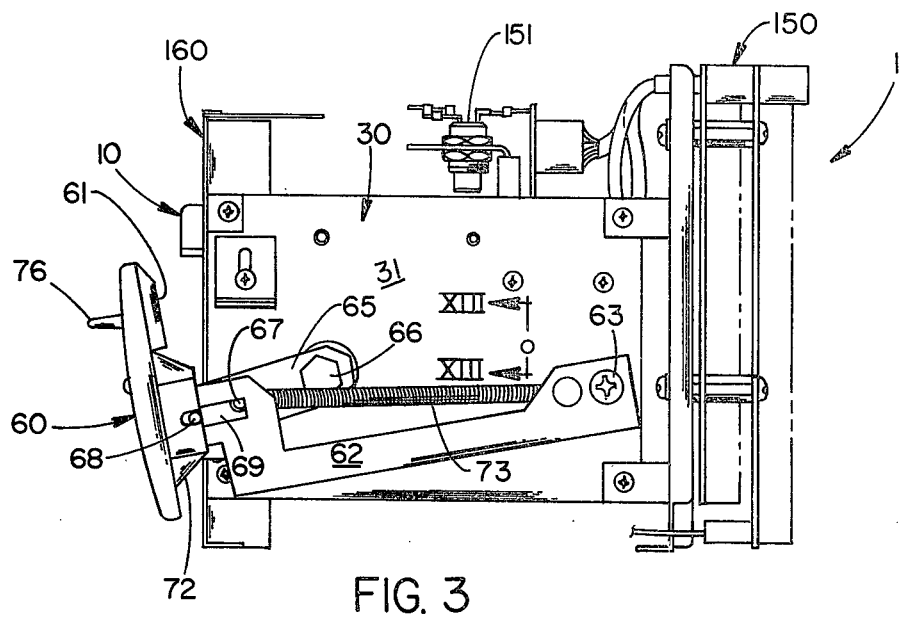
FIG. 3 is a side elevational view of the recorder with the door open.
Figure 4:
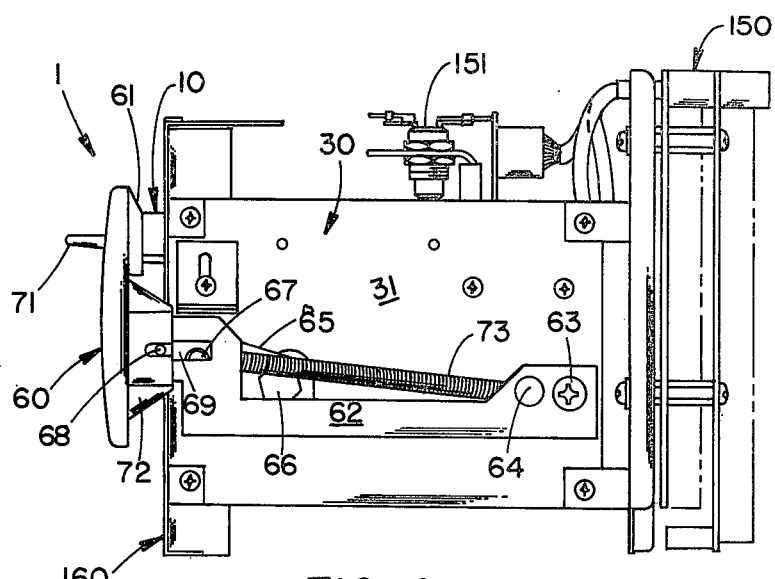
FIG. 4 is a side elevational view of the recorder with the door closed.

Door 60 is preferably molded of plastic or the like. It includes a small projecting handle 71 and the integrally molded forwardly projecting shoulder abutments 61 referred to above for contacting the rear of cartridge 10 (FIGS. 1 through 4). A rearwardly projecting flange 72 on each side of door 60 is joined to a metal door mounting arm 62 (FIGS. 3 and 4). Door arm 62 is in turn pivotally mounted to a side wall 31 of chasis 30 by means of a door mount pivot post 63. A cam arm 65 is similarly pivotally mounted to each side wall 31 of chasis 30 at a forward pivot post 66 located forwardly of pivot post 63. A spring 73 extends from a spring mounting post 64 on door arm 62 to a spring mounting post 67 on cam arm 65. A guide pin 68 projects from cam arm 65 and engages a slot 69 within door arm 62 and door connecting flange 72. In this way, door 60 is over center cammed so that it is spring biased either to an open position as shown in FIG. 3 or to a closed position as shown in FIG. 4.

The opening and closing of door 60 also controls the movement of locater arms 80 and 100. As explained more fully below, a lost motion linkage arrangement insures that all three locater arms, 80 and 100, operate independently at least slightly of one another to insure uniform contact with the bottom of cartridge 10.

Figure 14:
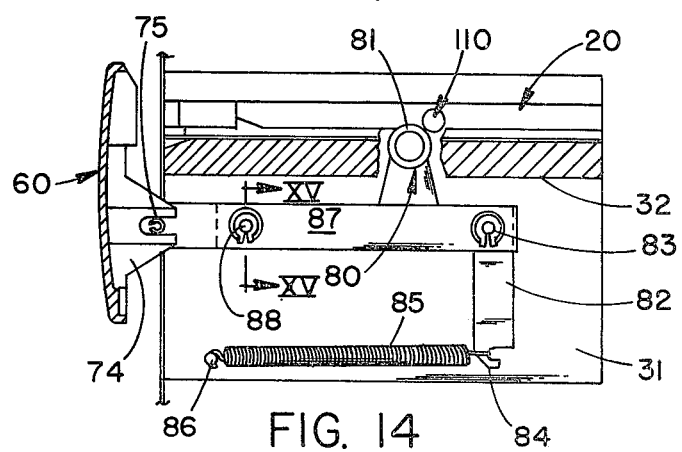
FIG. 14 is a cross-sectional view taken along plane XIV—XIV of FIG. 2.
Figure 15:
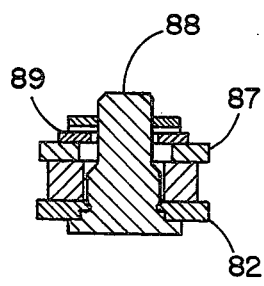
FIG. 15 is a fragmentary cross-sectional view taken along plane XV—XV of FIG. 14.
Figure 13:
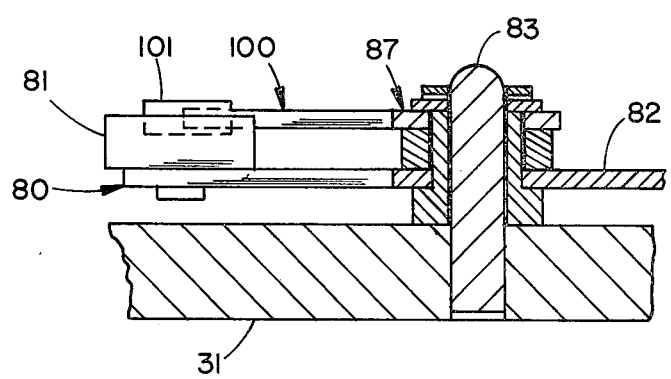
FIG. 13 is a fragmentary, cross-sectional view taken along plane XIII—XIII of FIG. 3.

Spaced inwardly from flanges 72 are linkage mounting flanges 74 (FIG. 14). There are two pair of flanges 74 and each pair embraces therebetween the end of a linkage arm 87 which is held in location by a pin 75. Linkage arm 87 is povitally mounted on pivot post 83 which is secured to the inside of the side wall 31 of chasis 30 at a point below platform 32. Also pivotally mounted on pivot post 83 and spaced to the inside of linkage arm 87 is a generally L-shaped lever 82 (FIGS. 14 and 13). Lever 82 includes a downwardly depending portion with a spring hook 84 at the bottom thereof around which one end of a spring 85 is connected. The other end of spring 85 is connected to a spring mounting post 86 mounted to the inside of chasis side wall 31. Lever 82 is generally L-shaped and extends forwardly from mounting post 83 and is interconnected with linkage arm 87 by means of a connector stud 88 (FIGS. 14 and 15). The forward most extremity of lever 82 is indicated by hidden lines in FIG. 14 since it lies behind linkage arm 87. It does not extend forwardly as far as linkage arm 87 and indeed stops just a little distance past stud 88. In this way, lever arm 82 tends to move up and down in the same arc motion as does linkage arm 87 which in turn moves up and down through its arc as door 60 is opened and closed. Projecting upwardly from each lever 82 is the forward locater arm 80 (FIGS. 13 and 14). A plastic roller 81 is located at the top of each locater arm. Thus, arms 80 also tend to move upwardly and forwardly in an arc to provide both upward and forward pressure on cartridge 10.

At this point, it is significant to note that arms 80 are biased upwardly by spring 85 independently of the biasing action of spring 73. This is facilitated by a lost motion arrangement consisting of an aperture 89 in linkage arm 87, through which stud 88 extends, which is made larger than the diameter of stud 88 at that point. Accordingly, lever 82 can move independently to a slight degree of linkage arm 87. (FIG. 15). This insures that proper pressure will be placed on cartridge 10 not only by the action of the shoulder abutments 61 on door 60 pushing it from the rear, but also by the independent pressure applied by locater arms 80 in an upward and forward direction. This also insures that the two locater arms 80 will operate independent of one another to a slight degree to insure uniform upward pressure on cartridge 10 at either side thereof.

Locater arms 80 extend upwardly through platform 32 through appropriate openings 90 which can be partially seen in FIG. 8, but generally lie underneath rails 20. In operation, when door 60 is closed, the rollers 81 on arms 80 come into engagement with the notches 14 (FIG. 10) on cartridge 10 and press cartridge 10 not only upwardly against locater bearing 110, but also tend to push cartridge 10 forwardly. All of this helps to insure the proper location of cartridge 10 in its fixed plane relative to recording head 40.

The linkage and lever arrangement as described and shown in FIG. 14 is identical for the opposite side of recorder 1, except that the linkage arm 87 on the opposite side of the recorder additionally includes an upwardly projecting rear locater arm 100 (FIGS. 12 and 13). It includes a suitable cap 101 which engages the bottom of cartridge 10 and pushes it up against one of the three locater bearings 110 (see particularly FIG. 12). Again it is very important that there be the possibility for some slight relative movement between linkage arm 87 and lever 82 so that rear locating arm 100 and forward locating arms 80 are not absolutely tied into one another. Thus even if forward locating arms 80 come to their final resting position before rear locating arm 100 has finally pushed the rear of cartridge 10 upwardly, rear locating arm 100 will still continue to travel due to the play between linkage 87 and lever 82 (FIG. 15) and will come to rest against the rear of cartridge 10 and push it upwardly tightly against the rear locater bearing 110.

The three locater bearings are small steel studs or the like which are wear resistant so that they will always positively locate cartridge 10 in the same location. Small cutouts are provided in rails 20 for receiving the small circular locater bearings 110. (FIGS. 12 and 14) It will be noted that the bottoms of the bearings 110 project downwardly slightly below the level of rails 20 to insure that final positioning contact is made between the top edge surfaces of the bottom plate 16 of cartridge 10 and locating bearings 110. As can be seen by reference to FIGS. 12 and 14, there is a forward bearing in 110 and a rear bearing 110 in one of the rails 20 and only a single bearing 110 located towards the front or head end of the recorder in the opposite rail 20.

Microswitches 140 located on platform 32 are conventional in nature. One is wired as enabling switches to tell the system a cartridge is in position. The other cooperates with a device on the cartridge to either prevent or allow recording. Mounted on the rear of chasis 30 is the electrical circuit board 150 or perhaps a series of electronic circuit boards. Appropriate wiring then connects to the head 40, the motor 51 into an indicator 151 shown in FIGS. 1 and 2. Indicator 151 is designed to read sensing indicators on tape 19.

Figure 5:
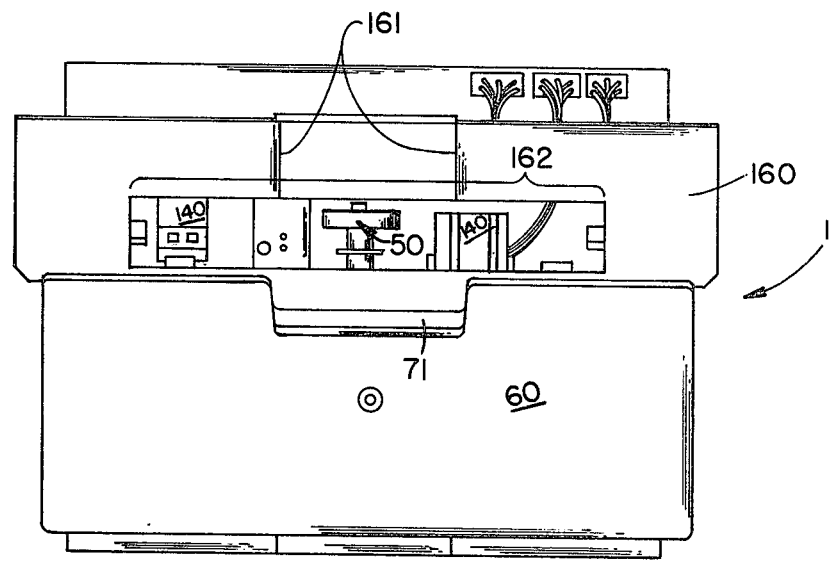
FIG. 5 is a front elevational view of the recorder with the door open.
Figure 6:
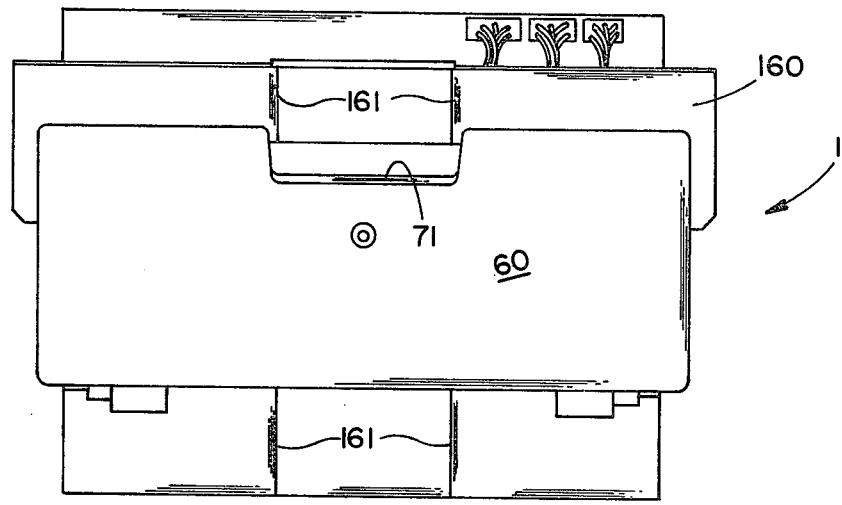
FIG. 6 is a front elevational view of the recorder with the door closed.

The front of the recorder is closed off by a front plate 160 mounted to the front of chasis 30 (FIGS. 4 through 6 and 12). It is a formed sheet metal part and includes a hand grasp recess portion 161 which fits into the corresponding recess 34 in the front of chasis 31. Front plate 160 also includes a suitable cartridge opening 162 for receiving cartridge 10 (FIG. 5). Referring to FIG. 5, it can be seen that when one is looking at the front of recorder 1 with door 60 in an open position, one can see drive wheel 50, recording head 40 and microswitches 140 waiting for engagement by cartridge 10.

In operation, one opens door 60 as shown in FIG. 5 and inserts cartridge 10 until its drive idler 12 comes to rest against drive wheel 50. One then simply places its fingers under the handle flange 71 of door 60 and lifts against the pressure of springs 73 until door 60 comes over the center of cam arm 65 at which point springs 73 pull door 60 the rest of the way shut. In the process, locater arms 80 come into position with their wheels 81 in notches 14 and push the front of cartridge 10 up against forward locater bearings 110 and forwardly towards microswitches 140, drive wheel 50 and head 40. Once locater arms 80 are "home", door 60 continues to travel upwardly as do linkage arms 87 and rear locater arm 100. Rear locater arm 100 serves to push up the rear of cartridge 10 against the single rear locater bearing 110 and the shoulder abutment 61 on door 60 comes up against the rear of cartridge 10 to further insure that cartridge 10 is driven into its final operative position. In the process, microswitches 140 are activated and the system is now operable. When activated, motor 51 rotates drive wheel 50 which in turn rotates drive idler 12 then cartridge 10. Motor 51 is reversable and can therby readily drive tape 19 either way in cartridge 10 at very high speeds.

Of course, it is understood that the above is merely a preferred embodiment of the invention and that various changes and alterations can be made without departing from the spirit and broader aspects of the invention.

The embodiments of the invention in which an exclusive property or privilege is claimed are defined as follows:

1. A cartridge loading tape recorder having tape drive means and a recording head for playing or recording on a tape in a tape cartridge, the improvement in said recorder comprising; three spaced-point-locating bearing members mounted on said recorder and defining a reference plane relative to said recording head; three arms moveably mounted on said recorder for movement towards and away from said reference plane of said three bearing members; means for moving said three arms towards said reference plane, said arms being dimensioned and located such that as said moving means move said arms towards said reference plane, said arms engage and act to push a cartridge up against said three bearing members to thereby insure that a cartridge is properly located in the proper reference plane relative to said recording head; and means urging said cartridge forwardly in said reference plane towards said recording head to insure proper contact between said recording head and said cartridge.

2. The recorder of claim 1 in which lost motion linkage means operably interconnect said three arms with said means for moving said arms whereby said three arms can be moved generally simultaneously towards said reference plane, but whereby, due to the lost motion nature of said linkage means, each of said three arms will act independently in contacting a cartridge and pushing it tightly against said three bearing members.

3. The recorder of claim 2 in which said means for pushing said cartridge forwardly includes at least one of said arms being pivotally mounted on said recorder for movement in an arc to create a combined upward and forward motion whereby when said arm engages said cartridge, it moves it not only upwardly but slightly forwardly.

4. The recorder of claim 3 in which said means for pushing a cartridge forwardly further comprises shoulder abutments operably connected to said means for moving said arms towards said reference plane, said shoulder abutments being located so as to move into engagement with the rear of a cartridge and push it forwardly as said means for moving said arms is activated.

5. The recorder of claim 4 in which said means for moving said arms comprises a door mounted for movement between an opening and closing position on said recorder, said recorder including an aperture into which a cartridge is inserted when it is to be loaded into said recorder, said door serving as a closure for said opening.

6. The recorder of claim 5 in which said door is interconnected to each of two spaced linkage arms; each said linkage arm being pivotally mounted to said recorder on a pivot mount; an arm lever being pivotally mounted on each said pivot mount adjacent each said linkage arm, each said arm lever including one upwardly projecting one of said locating arms; each said arm lever being additionally pinned to its respective linkage member, there being a lost motion aperture for receiving said pin to thereby allow for a small amount of relative movement between said arm lever and said linkage member and thereby constituting said lost motion linkage means; bias means biasing each said arm lever for movement towards said reference plane defined by said three locating bearings; at least one of said linkage members including an upwardly projecting arm comprising said third arm; biasing means biasing said door at least for movement upwardly to a closed position and thereby biasing said third arm upwardly towards said reference plane defined by said locating bearings.

7. The recorder of claim 6 in which said door is joined to two spaced door mounting arms, each pivotally mounted on said recorder; a cam arm for each said door arm being pivotally mounted to said recorder at a point spaced from said pivot point of said door arm; said door biasing means interconnecting said door mounting arm and said cam arm; said cam arm including a pin projecting laterally therefrom toward said door mounting arm and said door mounting arm including a slot receiving said pin whereby through operation of said cam arm, said biasing means interconnecting said cam arm and said door mounting arm acts to bias said door towards a closed position as it is moved towards the closed position and acts to bias said door towards an open position as it is moved towards said open position.

8. The recorder of claim 1 including a door which is interconnected to each of two spaced linkage arms; each said linkage arm being pivotally mounted to said recorder on a pivot mount; an arm lever being pivotally mounted on each said pivot mount adjacent each said linkage arm, each said arm lever including one upwardly projecting one of said locating arms; each said arm lever being additionally pinned to its respective linkage member, there being a lost motion aperture for receiving said pin to thereby allow for a small amount of relative movement between said arm lever and said linkage member and thereby constituting said lost motion linkage means; bias means biasing each said arm lever for movement towards said reference plane defined by said three locating bearngs; at least one of said linkage members including an upwardly projecting arm comprising said third arm; biasing means biasing said door at least for movement upwardly to a closed position and thereby biasing said third arm upwardly towards said reference plane defined by said locating bearings.

9. The recorder of claim 8 in which said door is joined to two spaced door mounting arms, each pivotally mounted on said recorder; a cam arm for each said door arm being pivotally mounted to said recorder at a point spaced from said pivot point of said door arm; said door biasing means interconnecting said door mounting arm and said cam arm; said cam arm including a pin projecting laterally therefrom toward said door mounting arm and said door mounting arm including a slot receiving said pin whereby through operation of said cam arm, said biasing means interconnecting said cam arm and said door mounting arm acts to bias said door towards a closed position as it is moved towards the closed position and acts to bias said door towards an open position as it is moved towards said open position.

10. The recorder of claim 1 in which said tape drive means comprises: a tape drive member and a motor operably connected thereto for rotating said tape drive member, said motor being slidably mounted on a track; means biasing said motor and said operably connected tape drive in a direction towards a cartridge when it is inserted in said recorder whereby a tight, biased connection is achieved between said drive member and said cartridge.

11. The recorder of claim 10 in which said motor is mounted on a temperature insulating, temperature resistant mount platform which in turn is slidably mounted in said track whereby heat and noise from said motor are insulated from the rest of the recorder by said mounting platform.

12. The recorder of claim 11 in which said mounting platform comprises a glass filled, high temperature plastic polymer material.

13. The recorder of claim 12 which includes a chasis having a main platform with an exposed rear edge, said track and said motor mount platform being located on the underside of said main platform; said motor mount platform including an upwardly projecting rear stop means which projects above the level of said main platform in line with said exposed rear edge whereby forward movement with said motor mount is limited.

14. The recorder of claim 1 which includes a chasis comprising an extruded member of generally H-shaped cross section, each leg of said H defining a side of said chasis and the cross bar of said H defining a platform; said extruded chasis including two integrally formed inwardly projecting guide rails, one located on each said side wall and projecting inwardly toward the other and being located above said platform and spaced slightly therefrom for fitting into the track of a cartridge as it is slid into position within said chasis; said head and said drive means being operably mounted on said platform of said chasis.

15. The recorder of claim 14 in which two of said bearing members are located in alignment with one of said rails and one of said bearing members is located in alignment with the other of said rails; all of said bearing members projecting below the bottom level of said rails whereby a cartridge track will positively engage said bearing members when pushed into position by said arms.

16. The recorder of claim 15 in which said rails include cutout portions within which said bearing members are received.

17. The recorder of claim 15 which includes two spaced linkage arms, one pivotally mounted on a pivot mount on the inside face of one side of said chasis below said platform and the other likewise mounted on the other side of said chasis; an arm lever being pivotally mounted on each said pivot mount adjacent each said linkage member, each said arm lever including one upwardly projecting one of said locating arms; each said arm lever being additionally pinned to its respective linkage arm, there being a lost motion aperture for receiving said pin to thereby allow for a small amount of relative movement between said arm lever and said linkage member; bias means biasing each said arm lever for movement towards said reference plane defined by said three locating bearings; at least one aperature being located in said platform for each said locating arm; at least one of said linkage members including un upwardly projecting arm comprising said third arm; means interconnecting said linkage arms and biasing means biasing said interconnecting means at least for movement upwardly and thereby biasing said third arm upwardly towards said reference plane defined by said locating bearings.

18. The recorder of claim 17 in which said means interconnecting said linkage arms comprises a door; said door being joined to two spaced door mounting arms, each pivotally mounted on opposite ones of said sides of said chasis, on the outside surfaces thereof; a cam arm for each said door arm being pivotally mounted to each said side of said chasis at a point spaced from said pivot point of said door arm and also on the outside thereof; said door biasing means interconnecting said door mounting arm and said cam arm; said cam arm including a pin projecting laterally therefrom toward said door mounting arm and said door mounting arm including a slot receiving said pin whereby through operation of said cam arm, said biasing means interconnecting said cam arm and said door mounting arm acts to bias said door towards a closed position as it is moved towards the closed position and acts to bias said door towards an open position as it is moved towards said open position.

19. The recorder of claim 18 in which said tape drive means comprises: a tape drive member and a motor operably connected thereto for rotating said tape drive member, said motor being slidably mounted on a track located on the underside of said platform; means biasing said motor and said operably connected tape drive in a direction towards a cartridge when it is inserted in said recorder whereby a tight, biased connection is achieved between said drive member and said cartridge.

20. The recorder of claim 19 in which said motor is mounted on a temperature insulating, temperature resistant mount platform which in turn is slidably mounted in said track whereby heat and noise from said motor are insulated from the rest of the recorder by said mount platform; said mount platform including an upwardly projecting rear stop for engaging the rear edge of said chasis platform to thereby limit forward movement of said motor mount.

21. The recorder of claim 15 in which said tape drive means comprises: a tape drive member and a motor operably connected thereto for rotating said tape drive member, said motor being slidably mounted on a track located on the underside of said platform; means biasing said motor and said operably connected tape drive in a direction towards a cartridge when it is inserted in said recorder whereby a tight, biased connection is achieved between said drive member and said cartridge.

22. The recorder of claim 21 in which said motor is mounted on a temperature insulating, temperature resistant mount platform which in turn is slidably mounted in said track whereby heat and noise from said motor are insultated from the rest of the recorder by said mount platform; said mount platform including an upwardly projecting rear stop for engaging the rear edge of said chasis platform to thereby limit forward movement of said motor mount.

23. A cartridge loading tape recorder including a recording head and tape drive means, the improvement in said recorder comprising: locating means defining a reference plane generally in alignment with said recorder head; an opening for receiving a cartridge whereby a cartridge can be inserted into said opening and moved into a position adjacent said locating means; a door mounted on said recorder for opening and closing movement for opening and closing said cartridge receiving opening; at least one locating arm movably mounted within said recorder for movement towards and away from said locating means; said door including abutment means for abutting the rear of a cartridge positioned within said recorder and pushing it forwardly towards said recording head; linkage means interconnecting said door with said locating arm whereby as said door is closed, said locating arm moves towards the reference plane of said locating means for engaging said cartridge and pushing it snugly against said locating means to thereby assure that said cartridge will be in a proper reference plane relative to said head.

24. The recorder of claim 23 in which said door is interconnected to at least one linkage arm; said linkage arm being pivotally mounted to said recorder on a pivot mount; an arm lever being pivotally mounted on said pivot mount adjacent each said linkage arm, said arm lever including one upwardly projecting arm comprising said locating arm; said arm lever being additionally pinned to said linkage member, there being a lost motion aperture for receiving said pin to thereby allow for a small amount of relative movement between said arm lever and said linkage member; bias means biasing said arm lever for movement towards said locating means; reperate biasing means biasing said door at least for movement upwardly to a closed position.

25. The recorder of claim 24 in which said door is joined to two spaced door mounting arms, each pivotally mounted on said recorder; a cam arm for each said door arm being pivotally mounted to said recorder at a point spaced from said pivot point of said door arm; said door biasing means interconnecting said door mounting arm and said cam arm; said cam arm including a pin projecting laterally therefrom toward said door mounting arm and said door mounting arm including a slot receiving said pin whereby through operation of said cam arm, said biasing means interconnecting said cam arm and said door mounting arm acts to bias said door towards a closed position as it is moved towards the closed position and acts to bias said door towards an open position as it is moved towards said open position.

26. The recorder of claim 23 which includes a chasis comprising an extruded member of generally H-shaped cross section, each leg of said H defining a side of said chasis and the cross bar of said H defining a platform; said extruded chasis including two integrally formed inwardly projecting guide rails, one located on each said side wall and projecting inwardly toward the other and being located above said platform and spaced slightly therefrom for fitting into the track of a cartridge as it is slid into position within said chasis; said head and said drive means being operably mounted on said platform of said chasis.

27. The recorder of claim 26 in which said locating means project below said rail.

28. The recorder of claim 27 in which said pivot mount is located on an inside face of one of said sides of said chasis below said platform, said platform including an aperture through which said locating arm projects.

29. The recorder of claim 28 in which said door mounting arms and said cam arms are pivotally mounted to the outside of said sides of said chasis.

30. The recorder of claim 29 in which said tape drive means comprises: a tape drive member and a motor operably connected thereto for rotating said tape drive member, said motor being slidably mounted on a track located on the underside of said platform; means biasing said motor and said operably connected tape drive in a direction towards a cartridge when it is inserted in said recorder whereby a tight, biased connection is achieved between said drive member and said cartridge.

31. The recorder of claim 30 in which said motor is mounted on a temperature insulating, temperature resistant mount platform which in turn is slidably mounted in said track whereby heat and noise from said motor are insulated from the rest of the recorder by said mount platform; said mount platform including an upwardly projecting rear stop for engaging the rear edge of said chasis platform to thereby limit forward movement of said motor mount.

32. In a cartridge loading tape recorder having a chasis, a drive motor and a recording head, the improvement comprising: said chasis comprising an extruded member of generally H-shaped cross section, each leg of said H defining a side of said chasis and the cross bar of said H defining a platform; said extruded chasis including two integrally formed inwardly projecting guide rails, one located on each said side wall and projecting inwardly toward the other and being located above said platform and spaced slightly therefrom for fitting into the track of a cartridge as it is slid into position within said chasis; said head and said motor being operably mounted on said platform of said chasis.

33. The recorder of claim 32 which includes at least one linkage arm pivotally mounted on a pivot mount on the inside face of one side of said chasis below said platform; an arm lever being pivotally mounted on said pivot mount adjacent said linkage arm, said arm lever including one upwardly projecting locating arm; said arm lever being additionally pinned to said linkage arm, there being a lost motion aperture for receiving said pin to thereby allow for a small amount of relative movement between said arm lever and said linkage member; bias means biasing said arm lever for movement towards the plane defined by said rails.

34. The recorder of claim 33 in which there is a door connected to said linkage arm; said door being joined to two spaced door mounting arms, each pivotally mounted on opposite ones of said sides of said chasis, on the outside surfaces thereof; a cam arm for each said door arm being pivotally mouned to each said side of said chasis at a point spaced from said pivot point of said door arm and also on the outside thereof; biasing means interconnecting said door mounting arm and said cam arm; said cam arm including a pin projecting laterally therefrom toward said door mounting arm and said door mounting arm including a slot receiving said pin whereby through operation of said cam arm, said biasing means interconnecting said cam arm and said door mounting arm acts to bias said door towards a closed position as it is moved towards the closed position and acts to bias said door towards an open position as it is moved towards said open position.

35. The recorder of claim 34 in which said tape drive means comprises: a tape drive member and a motor operably connected thereto for rotating said tape drive member, said motor being slidably mounted on a track located on the underside of said platform; means biasing said motor and said operably connected tape drive in a direction towards a cartridge when it is inserted in said recorder whereby a tight, biased connection is achieved between said drive member and said cartridge.

36. The recorder of claim 35 in which said motor is mounted on a temperature insulating, temperature resistant mount platform which in turn is slidably mounted in said track whereby heat and noise from said motor are insulated from the rest of the recorder by said mount platform; said mount platform including an upwardly projecting rear stop for engaging the rear edge of said chasis platform to thereby limit forward movement of said motor mount.

37. In a cartridge loading tape recorder having a recording head, a tape drive member and a motor for rotating said tape drive member, the improvement in said recorder comprising: said motor being mounted on a temperature insulating, temperature resistant mount platform which in turn is slidably mounted in a track whereby heat and noise from said motor are insulated from the rest of the recorder by said mounting platform; means biasing said motor and its interconnected tape driver in a direction towards a cartridge when it is inserted in said recorder whereby a tight, biased connection is achieved between said drive member and said cartridge.

38. The recorder of claim 37 in which said mounting platform comprises a glass filled, high temperature plastic polymer material.

39. The recorder of claim 38 which includes a chasis having a main platform with an exposed rear edge, said track and said motor mount platform being located on the underside of said main platform; said motor mount platform including an upwardly projecting rear stop means which projects above the level of said main platform in line with said exposed rear edge whereby forward movement with said motor mount is limited.

40. The recorder of claim 37 which includes a chasis having a main platform with an exposed rear edge, said track and said motor mount platform being located on the underside of said main platform; said motor mount platform including an upwardly projecting rear stop means which projects above the level of said main platform in line with said exposed rear edge whereby forward movement with said motor mount is limited.

* * * * *